United States Patent
Bauman et al.

(10) Patent No.: US 7,172,237 B2
(45) Date of Patent: Feb. 6, 2007

(54) HIGH ROTATION ANGLE FOR GAS SPRING CONNECTION

(75) Inventors: Walter Douglas Bauman, Wixom, MI (US); David Merritt, Loris, SC (US)

(73) Assignee: AVM Industries, Novi, MI (US)

( * ) Notice: Subject to any disclaimer, the term of this patent is extended or adjusted under 35 U.S.C. 154(b) by 177 days.

(21) Appl. No.: 10/974,491

(22) Filed: Oct. 27, 2004

(65) Prior Publication Data

US 2005/0104413 A1    May 19, 2005

Related U.S. Application Data

(60) Provisional application No. 60/520,102, filed on Nov. 14, 2003.

(51) Int. Cl.
*B60J 1/08* (2006.01)
*F16C 11/00* (2006.01)

(52) U.S. Cl. .................................. 296/146.1; 403/122
(58) Field of Classification Search ............. 296/146.1, 296/76, 146.8; 403/122, 76
See application file for complete search history.

(56) References Cited

U.S. PATENT DOCUMENTS

| 4,768,895 A | 9/1988 | Ludwig |
| 4,895,472 A | 1/1990 | Dony |
| 5,372,446 A | 12/1994 | Chamberlin |
| 5,676,484 A | 10/1997 | Chamberlin |

*Primary Examiner*—Joseph D. Pape
(74) *Attorney, Agent, or Firm*—Carlson, Gaskey & Olds

(57) ABSTRACT

A gas spring is mounted through a unique mount structure including a socket joint. The socket joint is mounted in a yoke for rotation through 180° about an axis of the yoke. The inventive structure provides greater freedom of movement than the prior art, and in many applications will allow rotation for more than 180°.

16 Claims, 3 Drawing Sheets

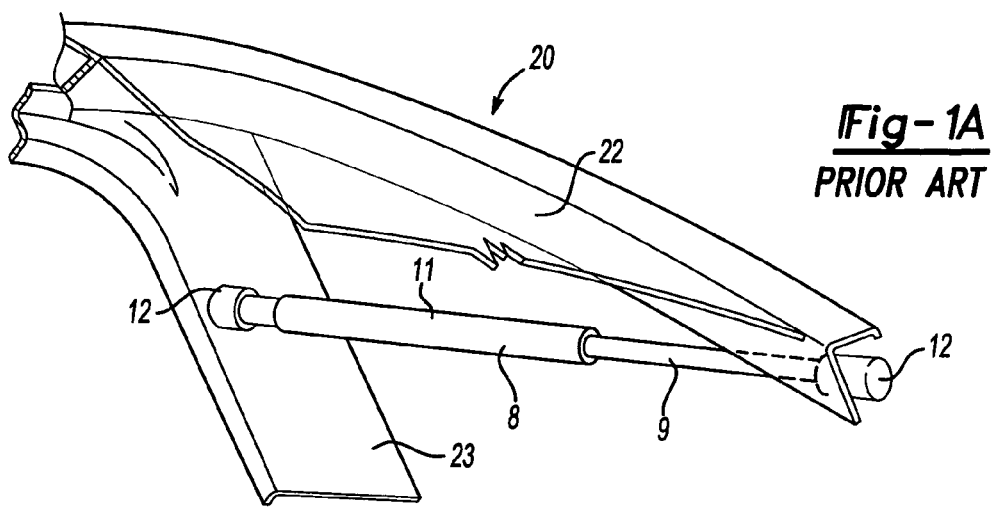
Fig-1A
PRIOR ART
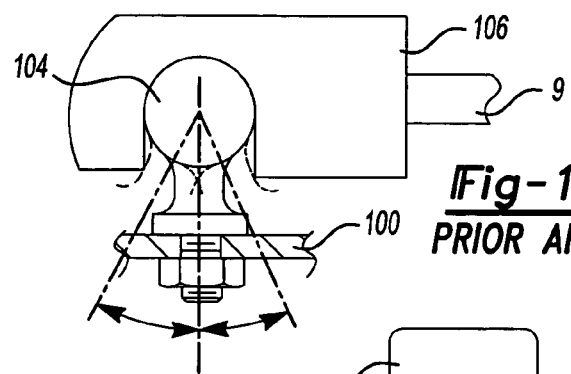
Fig-1C
PRIOR ART
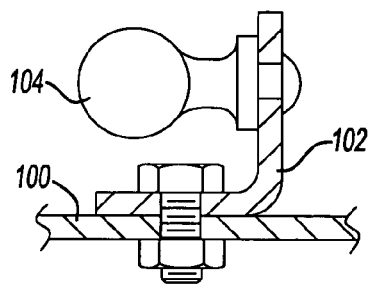
Fig-1B
PRIOR ART
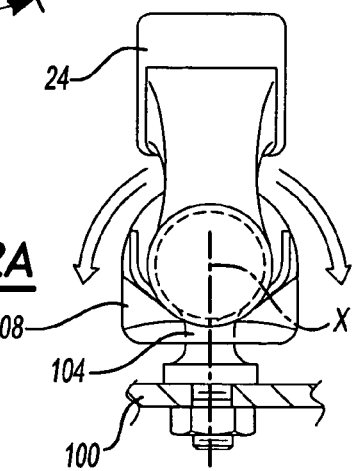
Fig-2A
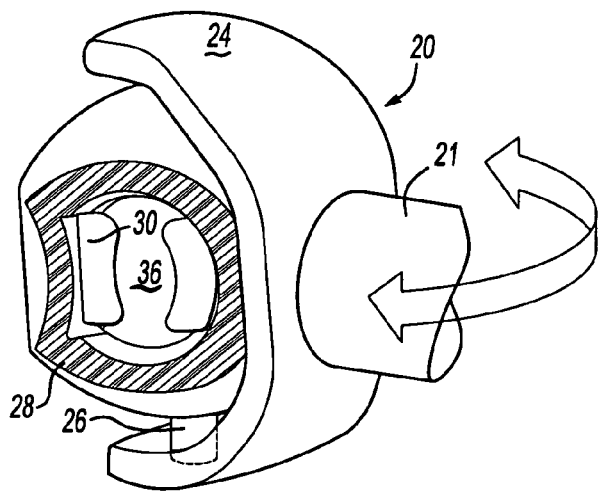
Fig-3A
Fig-2B

HIGH ROTATION ANGLE FOR GAS SPRING CONNECTION

RELATED APPLICATION

The application claims priority to U.S. Provisional Application No. 60/520,102, filed on Nov. 14, 2003.

BACKGROUND OF THE INVENTION

This invention relates to a yoke connection allowing 180° of rotation for the connection of a gas spring to a base.

Gas springs are utilized to provide a linkage between two components, at locations where movement between the components needs to be limited at certain times. One common example is a linkage between a closure, such as liftgate or trunk, and a body on a motor vehicle.

Typically, the gas spring includes a mount on one of the closure and the body. The mount includes a member received in a socket to provide freedom of rotation about at least one axis. However, in this configuration, the amount of available rotation is limited, at least about one axis of freedom. The prior art has typically required an additional bracket to provide an acceptable range of movement.

It would be desirable to provide a greater degree of freedom of rotation about a desired axis, and to eliminate the required bracket.

SUMMARY OF THE INVENTION

In a disclosed embodiment of this invention, a gas spring is connected to a structure through a ball and socket combination. The socket is mounted within a yoke such that the socket can rotate within a large angle of freedom relative to the yoke. In the disclosed embodiment, the yoke and socket is utilized to mount a closure to a vehicle body. However, other applications would benefit from this invention. The inventive yoke provides additional freedom of rotation on the order of 180°. Thus, no extra bracket to provide a distinct mount location is necessary.

The ball and socket combination may be as known in the art. The socket may receive an intermediate resilient member and a clip member to secure the ball within the socket. Such ball and socket combinations are known in the gas spring art. While the ball and socket combination provides a universal connection in theory, in practice, rotation about at least one axis is limited. The yoke connection provides additional freedom of movement about this axis.

An alternative arrangement has a socket receiving a member for rotation about a single axis. Again, this type combination is as known in the gas spring art.

The gas spring is disclosed to connect a closure to a vehicle body. One end of the gas spring, defined by an end of a piston rod, is secured to one of the closure and the vehicle body, and another end of the gas spring, defined by a cylinder, is secured to the other of the vehicle body and the closure. A yoke mount, as described above, may be utilized at either one, or both ends.

These and other features of the present invention can be best understood from the following specification and drawings, the following of which is a brief description.

BRIEF DESCRIPTION OF THE DRAWINGS

FIG. 1A shows a prior art liftgate mount arrangement.
FIG. 1B shows a bracket often required in the prior art.
FIG. 1C shows a problem that would exist in the prior art without the additional bracket.
FIG. 2A schematically shows a benefit of the inventive embodiments.
FIG. 2B shows further freedom of movement from the inventive embodiments.
FIG. 3A shows a first embodiment incorporating the subject invention.

DETAILED DESCRIPTION OF THE PREFERRED EMBODIMENT

Figures 3B, 3C, 3D:
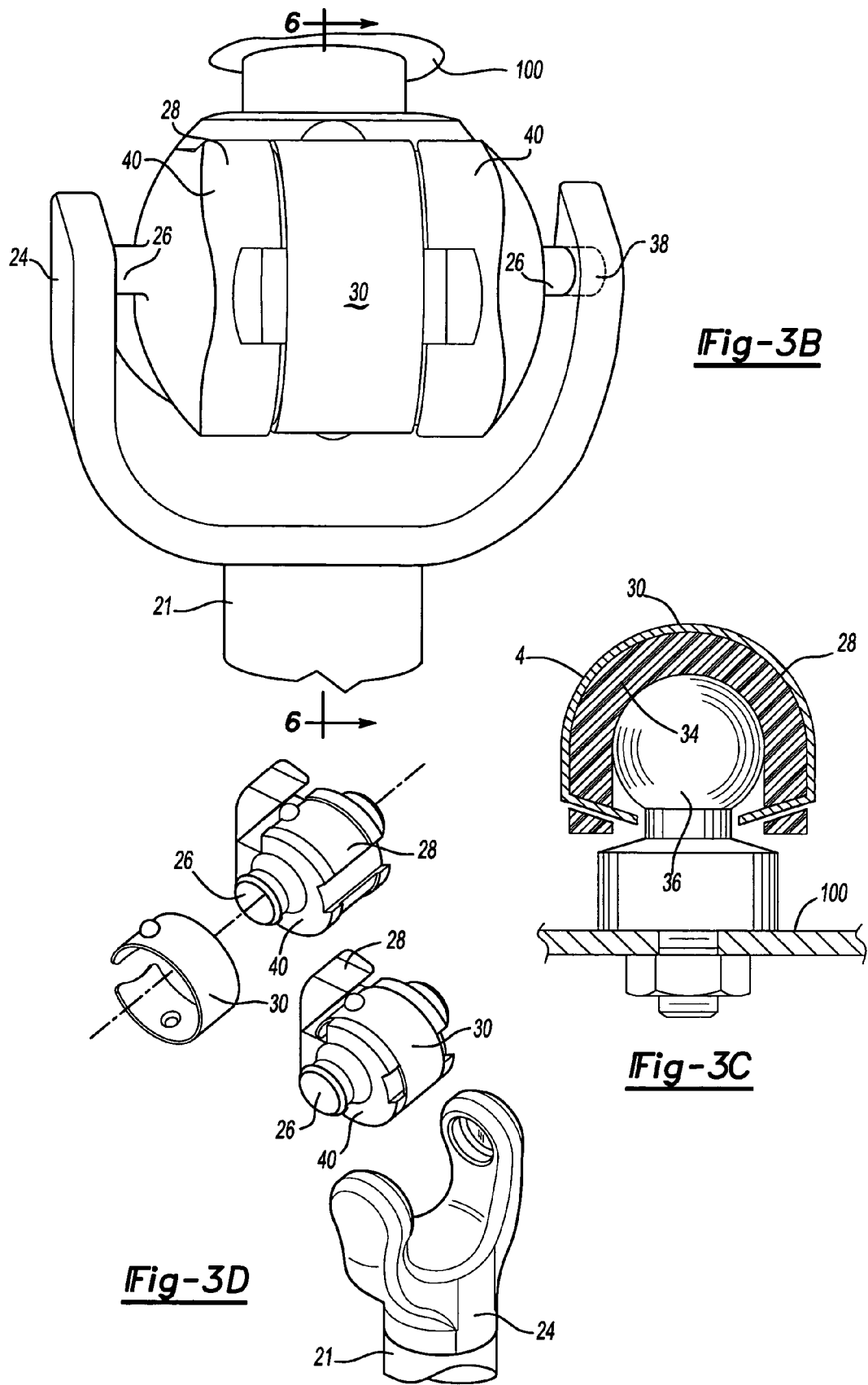
FIG. 3B is an opposed view of the first embodiment.
FIG. 3C is a cross-section through the first embodiment.
FIG. 3D is an exploded view of the first embodiment.

FIG. 1A shows a prior art arrangement 20 for mounting a liftgate 22 on a vehicle body 23. As shown, a gas spring 11 holds the liftgate 22 at an upwardly spaced position. The gas spring 11 is attached through socket connections 12 at each spring end.

As known, the gas spring 11 includes a piston 9 movable within a cylinder 8. While it is desirable to provide free relative movement between the gas spring 11, the liftgate 22 and the vehicle body 23, in fact, the amount of available movement of the gas spring 11 along at least one axis is limited due to the socket connection 12.

As shown schematically in FIG. 1B, the frame 100 of the vehicle (which might be part of the vehicle body 23 or the liftgate 22) must receive a bracket 102 to move a mounting ball 104 to a position spaced 90° from a plane of the frame 100. As will be explained below, the mounting ball 104 receives a socket structure.

As shown in FIG. 1C, the socket structure 106 may be connected such as to the piston rod 9. However, if the ball 104 is mounted to be generally parallel to the frame 100, and without the bracket 102, then the socket 106 might only be movable through a very limited range of movement relative to the frame 100. This range of movement is too limited for the mounts to be readily utilized in many applications, and may be on the order of 30°. Thus, the brackets 102 have typically been utilized.

FIG. 2A schematically shows the use of a yoke 24 to connect the ball 104 to the frame 100. The ball may be simply bolted to the frame 100, and the yoke 24 mounted to a socket member 108. As can be appreciated from FIG. 2A, the yoke 24 pivots about an axis X, and would have freedom of movement much greater than that provided by the FIG. 1C embodiment.

As can be appreciated from FIG. 2B, the freedom of movement within a plane of the axis X could be universal depending on the detail of the socket 108, and the ball 104. The movement provided about the axis X is in addition to this prior art movement.

As shown in FIG. 3A, the present invention includes a gas spring incorporating a yoke 24 that pivotally receives pins 26 from a socket 28. In the embodiment shown in FIG. 2A, a ball 36 is received in socket 28 and secured by a clip 30. The structure of ball 36, socket 28 and clip 30 is generally as known. In the prior art, the piston 9 was mounted directly to the socket. Here, the piston 21 (or the cylinder, not shown) is mounted to the yoke 24.

The piston 21 is received within a cylinder (not shown) in a manner similar to that shown in FIG. 1. As shown in FIG. 3B, clip 30 may secure a ball 36 (FIG. 3C) which is fixed to a mount structure 100, such as either or both of the body 23 and the liftgate 22. Piston 21 is attached to yoke 24. It should be appreciated a similar connection can be utilized between another mount location. This can be understood from FIG. 1A. FIG. 3D is an exploded view that shows further detail.

As shown, the socket 28 includes an inner member 34 and clip 30. As also shown in FIG. 3B, socket 28 includes side mount structures 40 on each side of the clip 30.

Side mount structures 40 carry pins 26 for pivoting movement through pin holes 38 in the yoke 24. Due to the ball 36 and socket 28 mount, the gas spring can move relative to vehicle body 23 (or liftgate 22) as in the prior art. However, about the axis of the pins 26, there is additional freedom of movement due to the inventive structure.

Figure 4A:
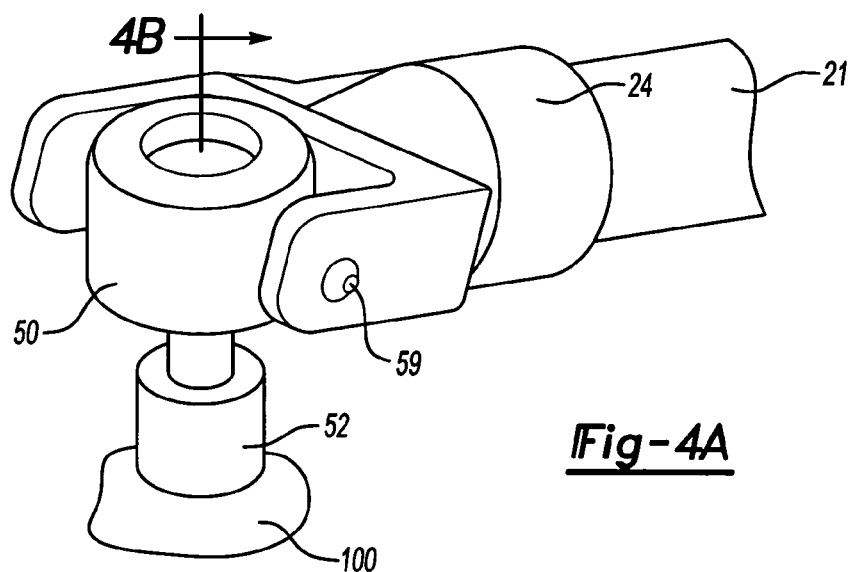
FIG. 4A shows a second embodiment.
Figure 4B:
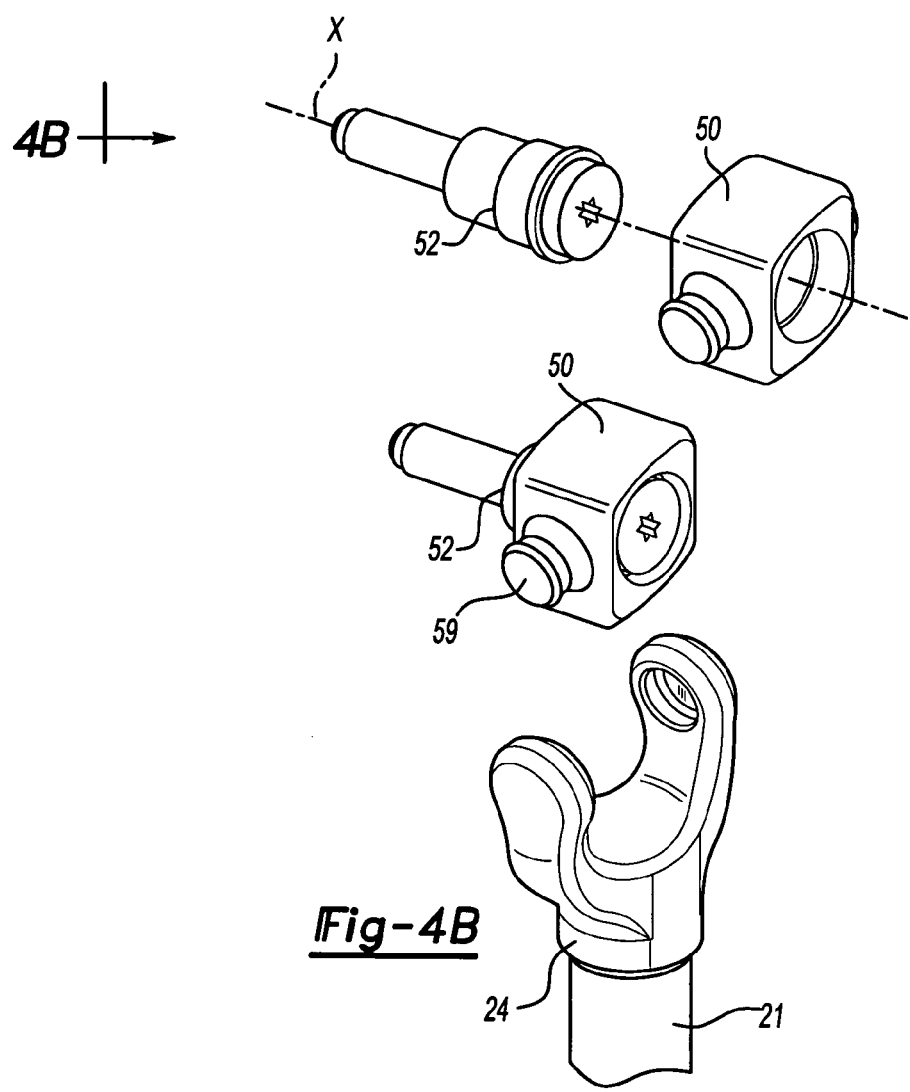
FIG. 4B is an exploded view of the second embodiment.

FIG. 4A shows another embodiment wherein a socket 50 is attached to a gas spring piston 21 through yoke 24. As with the first embodiment, a similar connection can also be utilized for the cylinder. Socket 50 has pins 59 pivotally mounted in yoke 24. A central member 52 is supported in socket 50. This structure operates similarly to the FIG. 3A–3D embodiments, however, the capture of the central member within the socket 50 is distinct. As known in the art, central member 52 can rotate about its elongate axis x within socket 50. FIG. 4B shows an exploded view of this embodiment.

The inner structure for holding the balls within the sockets may be as known in the art, and forms no portion of this invention. While two examples are shown, other types of connecting members and sockets come within the scope of this invention. Moreover, while only a liftgate is illustrated, other vehicle closures, and other non-vehicle applications, would benefit from a gas spring mount such as disclosed in this application.

While many manufacturing techniques can be utilized to make the inventive mount structures, it is preferred that the yoke and the socket are molded in a two-shot molding process, such that they are molded to each other, while still allowing the movement as described above. A worker of ordinary skill in the art would recognize how to provide such movement. Further, portions of the mount connections can be insert molded into the two-shot mold process.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A gas spring and mount combination comprising:
a gas spring having a piston movable within a cylinder, at least one of said piston and said cylinder extending to a yoke;
a socket pivotally received in said yoke, said yoke being free to pivot about said socket along a first axis; and
a connecting member received in said socket, and free to move within said socket about a second axis, distinct from said first axis.

2. The combination as set forth in claim 1, wherein said socket is pivotally mounted on pins within said yoke.

3. The combination as set forth in claim 2, wherein said pins are mounted in holes within said yoke.

4. The combination as set forth in claim 1, wherein said socket includes a clip for holding said socket against said connecting member.

5. The combination as set forth in claim 4, wherein said connecting member is ball shaped, such that said connecting member is free to move generally universally within said socket, but through a limited angle about said first axis.

6. The combination as set forth in claim 1, wherein said socket includes a securement member for securing said connecting member within said socket.

7. The combination as set forth in claim 6, wherein said connecting member is free to move only about said second axis within said socket.

8. A combination as set forth in claim 1, wherein said piston extends to a first end and said cylinder extends to a second end opposed to said first end, with socket and connecting member connections received within yokes at each of said first and said second ends.

9. A movable panel and vehicle body member assembly comprising:
a movable panel pivotally connected to a body member;
at least one gas spring intermediate said movable panel and said body member, said at least one gas spring having a piston movable within a cylinder, a piston mount structure for mounting said piston to one of said movable panel and said body member, and a cylinder mount structure for mounting said cylinder to the other of said movable panel and said body member; and
at least one of said piston and said cylinder mount structures having a socket mounted in a yoke attached to a respective one of said piston and said cylinder, said yoke being free to pivot about said socket along a first axis, and said socket receiving a connecting member being fixed to one of said movable panel and said body member such that said connecting member can pivot about at least a second axis, distinct from said first axis, relative to said socket.

10. The assembly as set forth in claim 9, wherein said socket includes a clip for holding said socket against said connecting member.

11. The assembly as set forth in claim 10, wherein said connecting member is ball shaped, such that said connecting member is free to move generally universally relative to said socket, but through a limited angle about said first axis.

12. The assembly as set forth in claim 9, wherein said socket includes a securement member for securing said connecting member within said socket.

13. The assembly as set forth in claim 12, wherein said connecting member is free to move only about said second axis within said socket.

14. The assembly as set forth in claim 13, wherein said socket is pivotally mounted on pins within said yoke.

15. The assembly as set forth in claim 9, wherein said socket is pivotally mounted on pins received within said yoke.

16. The assembly as set forth in claim 9, wherein both of said piston and said cylinder mount structures include said socket and said connecting member, and with said sockets both being pivotally mounted within a yoke.

* * * * *